United States Patent [19]

Thomason

[11] Patent Number: 5,752,679
[45] Date of Patent: May 19, 1998

[54] SELF-SUPPORTING NONCONDUCTIVE CABLE STAND

[76] Inventor: Sandra Ellen Thomason, 17420 Meridian Rd., Lucerne Valley, Calif. 92356

[21] Appl. No.: 971,548

[22] Filed: Nov. 5, 1992

[51] Int. Cl.⁶ .................... F16L 3/00; F16M 11/00
[52] U.S. Cl. .................. 248/49; 248/125; 248/165; 248/201
[58] Field of Search .................. 248/49, 125, 165, 248/201, 225.31, 65, 70, 72, 73, 100, 101, 121, 122, 172, 670, 912

[56] References Cited

U.S. PATENT DOCUMENTS

| | | | |
|---|---|---|---|
| 855,219 | 5/1907 | Anthony, Jr. | 248/172 X |
| 2,180,480 | 11/1939 | Richardson | 248/125 |
| 2,675,132 | 4/1954 | Susil | 248/125 X |
| 3,162,922 | 12/1964 | Alziari | 248/125 X |
| 3,389,882 | 6/1968 | Schlosser | 248/125 |
| 4,202,090 | 5/1980 | Cook | 248/49 X |
| 4,244,542 | 1/1981 | Mathews | 248/49 |
| 4,415,150 | 11/1983 | Iezza | 248/165 X |
| 4,669,691 | 6/1987 | Solomon | 248/172 X |
| 4,754,711 | 7/1988 | Solomon | 248/122 X |
| 5,042,767 | 8/1991 | Yunker et al. | 248/201 |
| 5,240,211 | 8/1993 | Anderson | 248/125 |

*Primary Examiner*—Rinaldi I. Rada
*Assistant Examiner*—Clark F. Dexter

[57] ABSTRACT

A stand, comprised of adjustable parts provides a structure for utility cables to be set upon so they can be spliced or repaired. The stand is designed to be placed on flat or semi-flat surfaces without additional support. Constructed primarily from non-conductive material, such as plastic or fiberglass, the stand is lightweight and provides excellent protection from electrocution and gas explosions that may occur from adjacent utilities if disturbed. The stand does not have to be driven into the ground to gain support. It features horizontal and vertical adjustments that conform to cable levels at trench or manhole depths and also to size availability of potholes or pits making it a very productive tool in most situations.

6 Claims, 2 Drawing Sheets

5,752,679

SELF-SUPPORTING NONCONDUCTIVE CABLE STAND

BACKGROUND OF THE INVENTION

1. Field of the Invention

The invention relates generally to a device for supporting outside plant direct buried cable, as opposed to other devices which are specifically for use in overhead installations, such as U.S. Pat. No. 5,042,767. Outside plant direct buried cable can be described as power transmission cable, telecommunication cable television cable, and fiber optic cable.

2. Description of the Prior Art

Cable supports are used by outside plant utility companies to support cable while splicing or repairing. The problem with currently used supports is that when they are placed or assembled for use, they can be dangerous and unsafe. Cable supports are generally used in pits dug by back-hoes to expose underground facilities for customer service or repair projects. If cable supports are made out of metallic conductive material, the user will be subject to possible electrical shock from power induced through the metallic material. If the pit has water on the bottom, then electrocution from existing direct buried power is very probable.

There are cable supports that have to be driven into the ground, to achieve stability, in order to support the direct buried cable being spliced or repaired. This is extremely hazardous to not only the user, but to others nearby. Pounding a metallic support through a direct buried power line or a large gas line is certain danger. Nonconductive supports that have to be driven into the ground are no less dangerous. They can damage other direct buried facilities as they are being driven into the ground below work level. These damages are left undetected until service is later restored and a technician has to be subjected to it during trouble shooting to isolate that damage. A nonconductive cable support can crack or penetrate gas lines that while being driven can push rocks or stones together causing sparks enough to ignite the gas. This invention eliminates those hazards.

SUMMARY OF THE INVENTION

This invention relates to a device to support the various types of direct buried cables safely and correctly when being installed or repaired. It comprises a means for supporting a cable in a below ground level environment where underground facilities are placed, such that a safe rigid mount is established on an adjustable self standing support that will maintain the integrity of both the technicians safety and the adjacent facilities.

It is an object of the invention to provide a device to support a direct buried cable and protect the user from being harmed by adjacent facilities and weather conditions. A device of this means would not have to be driven into the ground because it has self standing capabilities thus eliminating any danger from coming in contact with direct buried power transmission lines and or gas mains. A device of this means would not be conductive, therefore, eliminating the possibility of being harmed through power surges due to power leakage or electrical storms.

Another object of this invention is to be adjustable in such a way that the vertical and horizontal embodiments may provide flexibility in positioning, therefore, able to conform to its surroundings and allowing space enough for technicians to perform job functions safely.

DESCRIPTION OF THE PREFERRED EMBODIMENT

Figure 1:
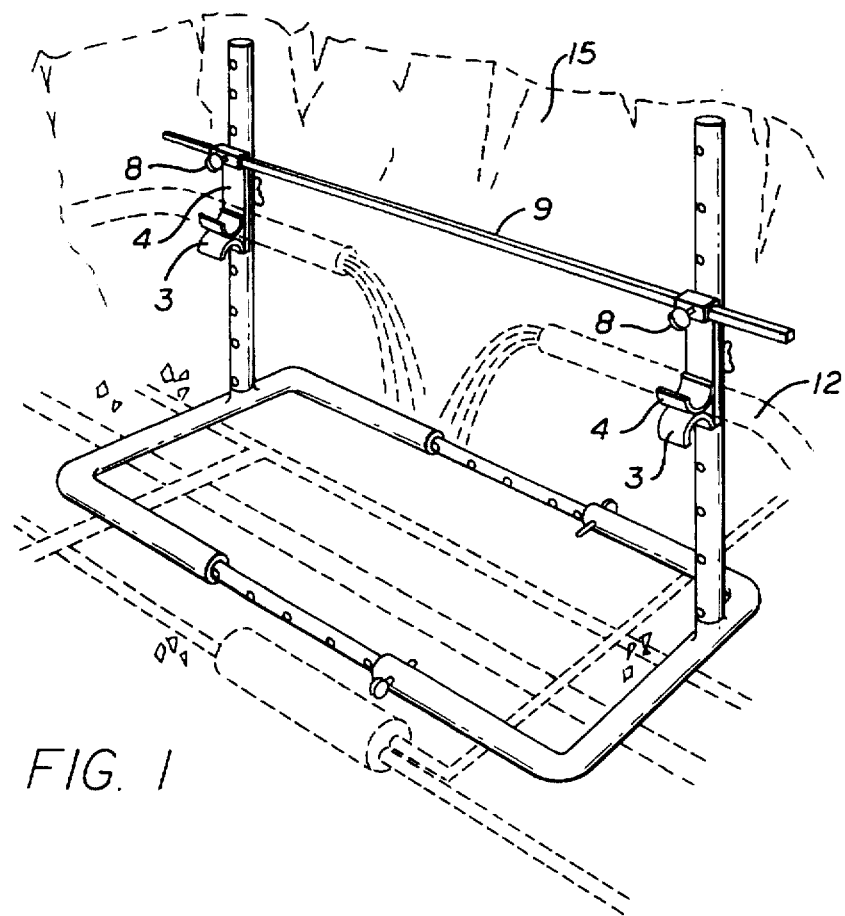
FIG. 1 is a view showing the embodiment of the "Self-Supporting Non-Conductive Cable Stand" device in its entirety.

Prior art support devices that resemble the present invention shown in FIG. 1 are made of, either all or in part, metallic material around the base that can conduct electrical surges to a technician from damaged power utilities or from water surrounding the base at the bottom of a pit 15. Still, other support devices resembling posts 3 have been used to support utilities like cable 12 in an area or space provided as that shown in FIG. 1. Prior art devices resembling post 3 are pointed at one end to penetrate the soil and then driven down through the dirt by a sledge hammer, or the like, to achieve stability, therefore, increasing the chance of damaging other utilities and or causing serious bodily harm.

To prevent these serious problems from happening, a cable 12 must be supported by a self-standing device in order to offer isolation from other utilities and their elements. These drawings illustrate that by making the base including base portions 1 & 2 and the posts 3 out of non-conductive material, an insulation factor will be provided for protection, thus, creating a safer working environment.

The drawing in FIG. 1 is illustrating a condition of a work environment as is set up on location 15. Base portions 1 & 2 are made of round non-conductive material such as plastic or fiberglass to act as an insulator. These parts are sectional in that they separate from each other into two portions. Base portions 1 & 2 are each generally U-shaped in form and include a middle seciton and two end sections, these three sections together forming the U-shape. The assembly of the base portions 1 & 2 form a rectangular shape for stability and adjustment. Base portion 1 differs from base portion 2 in that base portion 1 provides a smaller diameter section on both of its end sections for the end sections of base portion 2 to slide onto. Each smaller diameter section, in its cylindrical shape, allows the end sections of base portion 2 to slide back and forth until a desired position is achieved. These two base portion, when assembled, are designed to be placed on a flat or semi-flat surface in pits, level areas above ground and manholes to provide a stable foundation for the remaining pieces and also for the cable to be spliced.

Referring to the drawing in FIG. 1, posts 3 are two vertical pieces of round material attached to the middle sections of base portions 1 & 2. These vertical posts are also made of a non-conductive material like plastic or fiberglass for the purpose of insulation. When post 3 is connected to base portions 1 & 2, these vertical posts become a section of the stand that provides the desired height in which the cable will be placed by providing holes to position bracket 4.

Referring to the drawing in FIG. 1, bracket 4 is another component of the stand which is unique in its design. Two brackets are provided with are multi-functional in that (1), they provide the main support means for the cable, (2), they are interchangeable, since they can be fastened to either the right or left port 3, (3) they can be turned upside down to allow for different techniques and applications for splicing and still offer the cable a surface or slot to be set upon, and (4) they provide clamping portion 16 each having a square opening for bar 9 to be inserted into and to rest in which will allow the complete unit to slide back and forth for adjustments.

Referring to the drawing in FIG. 1, sliding bar 9 is another component of the stand that provides strength and a means for splicing tools to be fastened to. This bar is a piece of metal that can be used from any various types of stock available. It rests inside of the square openings provided by bracket 4 so that the rest of the assembly can be moved in and out for positioning. After positioning is finished, bolts 8 are then tightened so that the posts component as part 3 will become rigid holding bar 9 stationary. Sliding bar 9 can be made of steel or metal because it becomes isolated from any source that may cause harm, in that, it is fastened to bracket 4 which is attached to upright post 3 that is made of non-conductive material.

Referring to the drawing in FIG. 1, a metallic bolt 10 is a fastening means that can be from any various type of stock. These bolts are used to hold base portions 1 & 2 from sliding back and forth after the sections have been positioned for use. Base portions 1 & 2 have position holes through which bolts 10 are placed.

Figure 2:
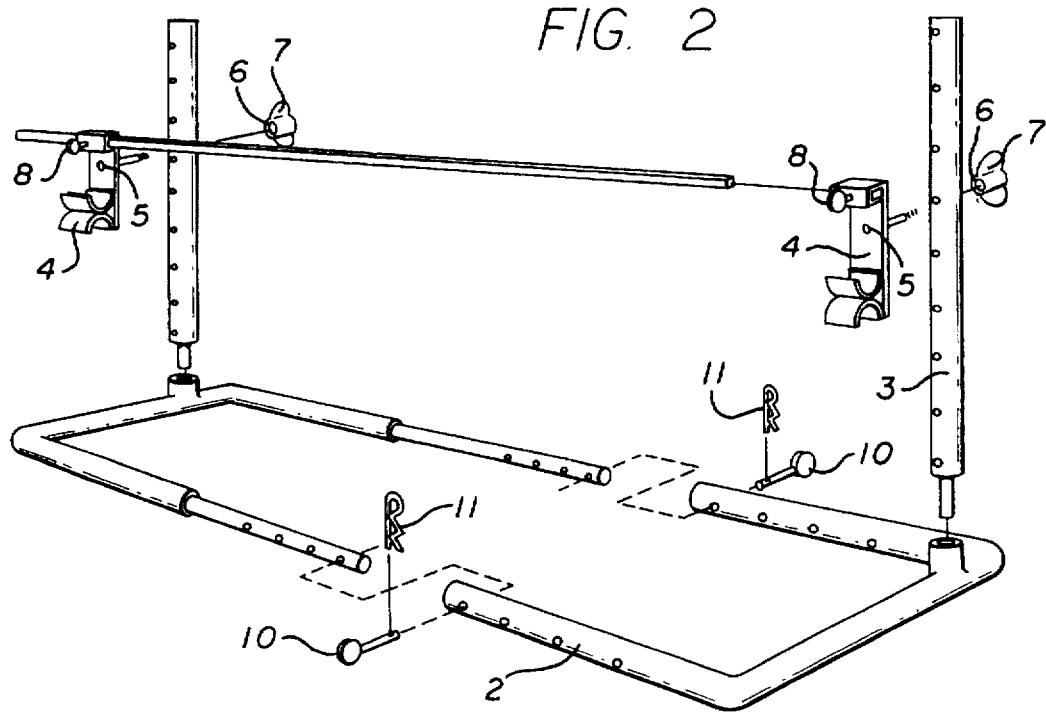
FIG. 2 is an exploded view, showing the embodiments in a pre-assembled state.

Referring to the drawing in FIG. 2, keeper pins 11 of any of the various types are used for keeping bolts 10 from pulling out of their placement.

Referring to the drawing in FIG. 2, threaded bolt 5 or screw means of many various types is used as a tightening means extending from a rear side of the bracket 4 to keep slide bar 9 vertically stationary after positioning.

Referring to the drawing in FIG. 2 a wing nut 7 or a similar device of the many various types is used as a means of tightening bracket 4 to post 3 after positioning bracket 4 to a desired height.

Figure 3:
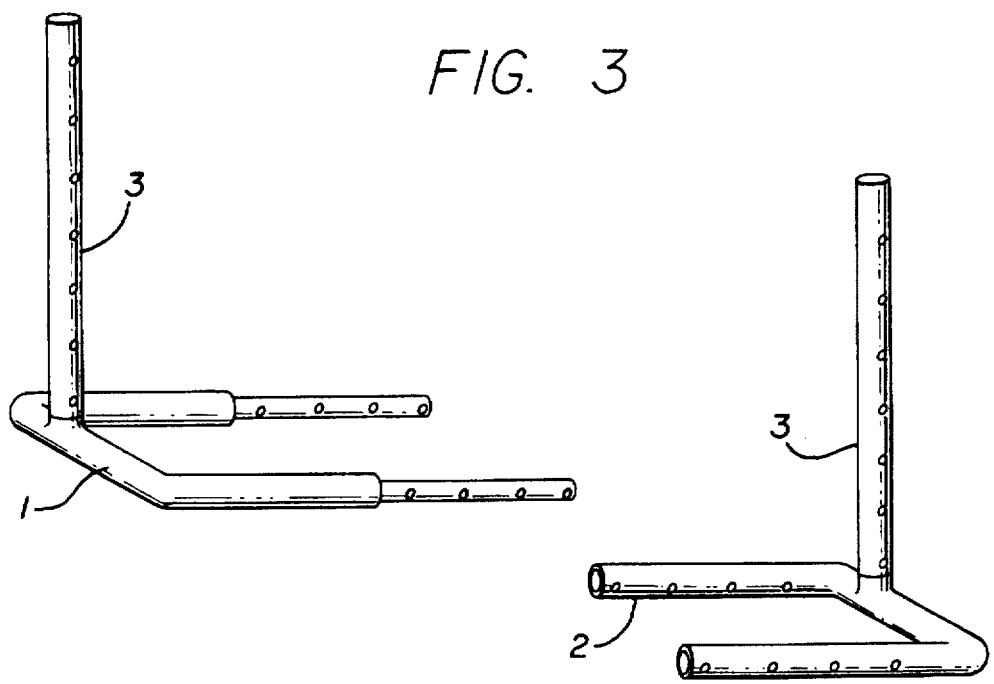
FIG. 3 is view showing the left and right sides of the invention in FIG. 1.

Referring to the drawing in FIG. 3, this drawing illustrates the parts that are made out of non-conductive material or fiberglass. This drawing also shows how the stand is designed generally into two separate sections.

Figure 4:
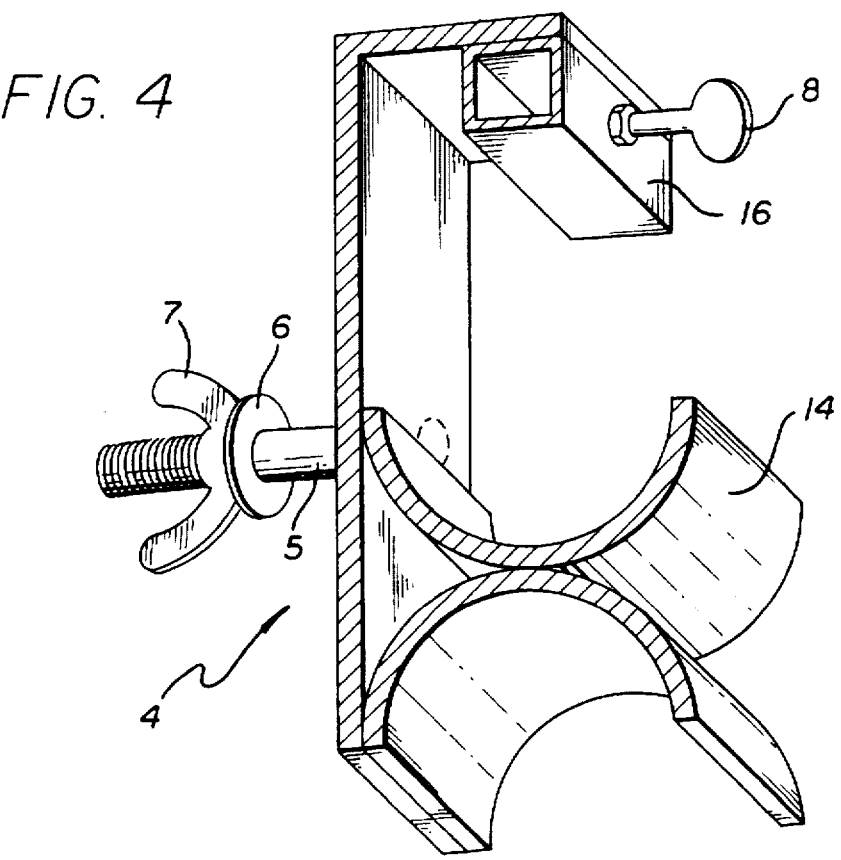
FIG. 4 is a side elevation view showing the cable support bracket of the invention.

Referring to the drawing in FIG. 4, the bracket 4 includes a cradle 14 which is constructed of two U-shaped members forming two half cylindrical surfaces, respectively, wherein the U-shaped members are juxtaposed and facing in opposite directions for the cable to rest in during set up and splicing. The cable can be tied down around this area to restrict cable movement to assure a correct cable opening.

Bracket 4 is designed to be used either right side up or upside down, depending on the technique and tools applied for splicing, thus, the purpose for the half cylindrical surfaces provide the same result in either position as long as they are facing up. When the bracket 4 is turned in either direction, the clamping portion 16 with the square opening at the one end of the bracket 4 performs its function identically. Clamping portion 16 is directly centered below or above the cradle 14 so that its counterpart, which is the smaller square sliding bar 9 that slides into and through this larger square opening, can be tightened after positioning and a surface for tools to be fastened directly above or below the splice opening. This bracket 4 has a bolt 5, washer 6 and nut 7 incorporated in the center on the backside to become fastened to or removed from the posts 3 and allows these left and right brackets 4 to become interchangeable.

Referring to the drawing in FIG. 2, this drawing illustrates the separate embodiments that compose the "Self-Supporting Non-Conductive Cable Stand Device" and how they are to be assembled and in what direction they move. Base portion 1 slides into base portion 2, then the two bolts 10 are placed through the positioning holes of base portions 1 & 2 and locked with pin 11, after a desired width is achieved. The keeper pins 11 are placed into the bolts 10 to keep base portions 1 & 2 from pulling apart. The vertical posts 3 are placed into the middle sections of base portions 1 & 2.

The weight of the cable placed onto bracket 4 will keep these vertical posts 3 secure. The slide bar 9 is placed into the square openings of the clamping portions of the brackets 4. The brackets, or cable heads, 4 are then placed up against through the positioning holes of the vertical posts 3 at a desired height such that the bolt 5 is inserted through a respective opening in the post 3, and washer 6 and nut 7 are tightened on bolt 5 so that bracket 4 will not pull out of post 3. Slide bar 9 can be tightened by bolt, or screw, 8 to keep slide bar 9 from moving. This completes the assembly process of the stand and can now be used as a device for splicing cable and provides technicians with a safer alternative for supporting cable by eliminating the use of other means that would have to be hammered into the ground which could cause serious injury and damage.

What is claimed:

1. A self-supporting non-conductive cable stand comprising a frame, first and second brackets mounted on said frame, and a slide bar mounted on said brackets, wherein said frame is formed by a horizontally extending base and first and second posts extending substantially vertically from the base;

the base including two generally U-shaped base portions, each base portion formed by a middle section and two end sections, these three sections together forming the U-shape, wherein the end sections of one of the base portions are adjustably connected to the end sections of the other of said base portions to adjust a horizontal spacing between said middle sections;

said first post removably mounted onto and extending from one of said middle sections and second post being removably mounted onto and extending from the other of said middle sections;

said first and second brackets each being removably mounted on a respective one of said posts, each said bracket including a support plate, a cradle including at least one U-shaped member mounted on a front of said support plate at one end thereof, a clamping portion on the front of said support plate at a second end thereof, and bracket fastening means disposed on a rear of said support plate for mounting each said bracket at a selected position on a respective one of said posts so that the bracket is positioned at a desired height from said base; and said sliding bar extending between said brackets and clamped in each one of said clamping portions to fix said sliding bar in place on said brackets.

2. The cable stand according to claim 1 wherein the frame is made of plastic.

3. The cable stand according to claim 1 wherein the frame is made of fiberglass.

4. The cable stand according to claim 1 wherein the end sections of one of said base portions are telescopically received in the end sections of the other of said base portions, and base fastening means are provided for fastening said end sections in a desired position to set said horizontal spacing.

5. The cable stand according to claim 1 wherein each post includes a plurality of through holes extending through the post and spaced along the length thereof, and wherein the bracket fastening means includes a fastening rod extending from a rear of said support plate and inserted through one of said holes such that it extends through the one post, and a nut threaded onto said fastening rod to mount each of said brackets on a respective one of said posts at said selected position on each post.

6. The cable stand according to claim 1 wherein said at least one U-shaped member of said cradle includes two juxtaposed, oppositely-facing U-shaped members.

* * * * *